United States Patent
Maier et al.

(10) Patent No.: US 11,660,580 B2
(45) Date of Patent: May 30, 2023

(54) LOADING SYSTEM FOR LOADING A REACTOR WITH BULK MATERIAL, WHICH SYSTEM CAN BE DISASSEMBLED AND DISMANTLED

(71) Applicant: Clariant International Ltd

(72) Inventors: Stefan Maier, Grafing (DE); Sebastian Werner, Vaterstetten (DE); Ebbe Juul Diekmann, Holte (DK)

(73) Assignee: CLARIANT INTERNATIONAL LTD, Muttenz (CH)

( * ) Notice: Subject to any disclaimer, the term of this patent is extended or adjusted under 35 U.S.C. 154(b) by 0 days.

(21) Appl. No.: 17/625,362

(22) PCT Filed: Jul. 8, 2020

(86) PCT No.: PCT/EP2020/069215
§ 371 (c)(1),
(2) Date: Jan. 7, 2022

(87) PCT Pub. No.: WO2021/013543
PCT Pub. Date: Jan. 28, 2021

(65) Prior Publication Data
US 2022/0258116 A1 Aug. 18, 2022

(30) Foreign Application Priority Data
Jul. 24, 2019 (DE) ...................... 10 2019 120 014.8

(51) Int. Cl.
*B01J 8/00* (2006.01)

(52) U.S. Cl.
CPC ............... *B01J 8/002* (2013.01); *B01J 8/003* (2013.01); *B01J 2208/00752* (2013.01); *B01J 2208/00769* (2013.01)

(58) Field of Classification Search
CPC .. B01J 8/002; B01J 8/003; B01J 2208/00752; B01J 2208/00769
See application file for complete search history.

(56) References Cited

U.S. PATENT DOCUMENTS

| | | |
|---|---|---|
| 5,344,616 A | 9/1994 | Brueggendick |
| 5,890,868 A | 4/1999 | Comardo |

FOREIGN PATENT DOCUMENTS

| | | |
|---|---|---|
| DE | 2255061 | 5/1974 |
| DE | 20221458 | 12/2005 |
| DE | 102008031153 | 2/2009 |
| DE | 202008004922 | 9/2009 |
| EP | 1072492 | 1/2001 |
| WO | 9802238 | 1/1998 |

*Primary Examiner* — Lessanework Seifu

(57) ABSTRACT

A dismountable and dismantlable loading system for loading a reactor with bulk material, is described. The dismantlable rail system with a multiplicity of rail segments can be connected to one another to form a self-contained rail system, wherein the individual rail segments have the ability to connect the rail segments to one another. Also provided is at least one rail vehicle for operation on the rail system, having a holding device for containers for receiving the bulk material, and at least one filling station for receiving the bulk material, having a hose present in the floor of the filling station for transporting the bulk material into various areas of the reactor.

20 Claims, 8 Drawing Sheets

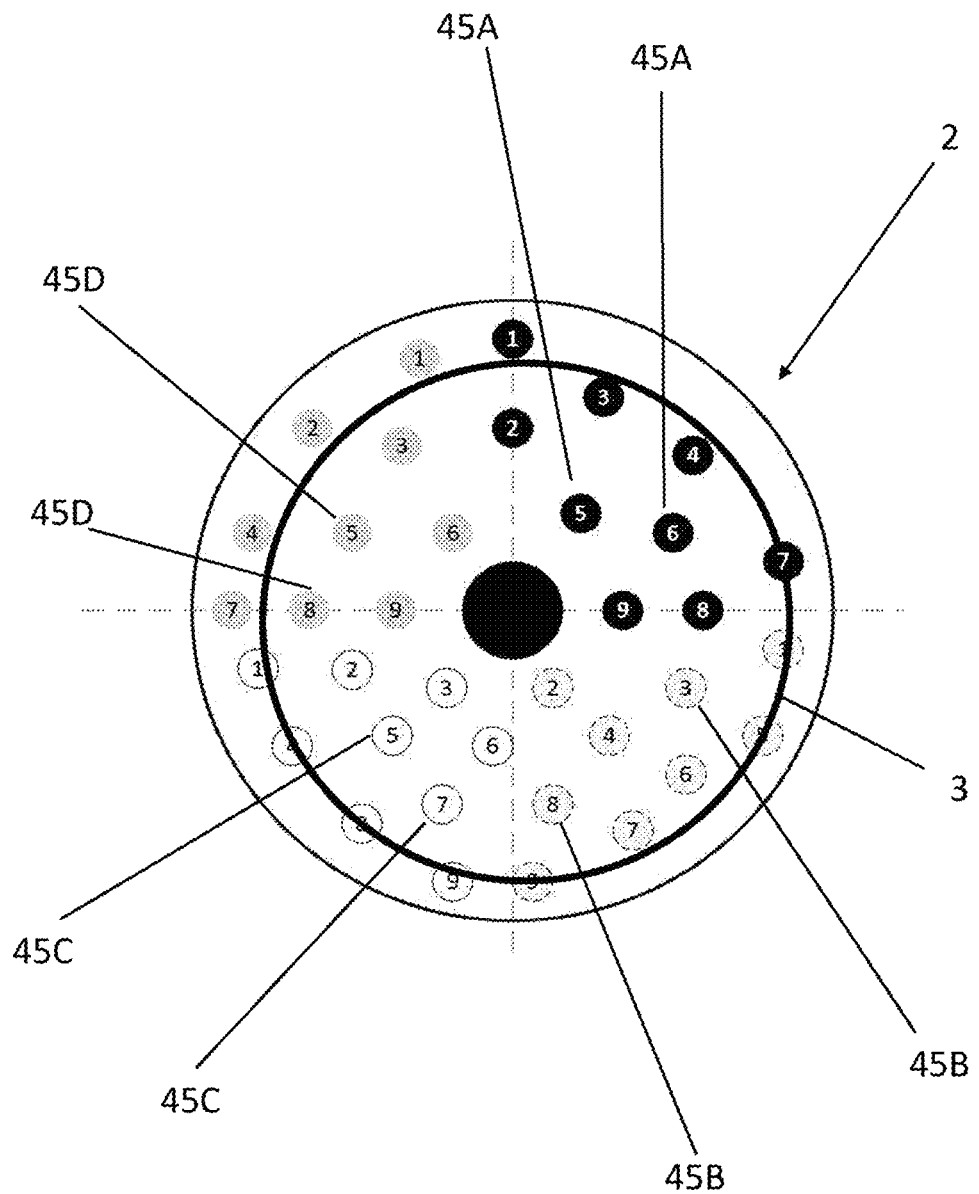

LOADING SYSTEM FOR LOADING A REACTOR WITH BULK MATERIAL, WHICH SYSTEM CAN BE DISASSEMBLED AND DISMANTLED

The filling of reactors with bulk material, for example catalyst material, starting compounds for synthesis or absorber material, is frequently a time-consuming loading process. The bulk material must under sometimes cramped conditions be introduced into the interior of the reactor through small openings in the reactor wall and then distributed in the reactor space.

Frequently, the bulk material is loaded into what is known as a "hopper" and introduced into the reactor interior space through a small opening in the reactor wall, what is known as the manhole, at the top of the reactor. After this, the bulk material has to be laboriously loaded in the transport bucket and distributed as uniformly as possible in different areas of the reactor interior space. The cramped conditions in the reactor interior space interfere with this and prevent uniform distribution of the bulk material in the reactor space.

WO 90/07371 A1 discloses a reactor for separating undesired constituents from an exhaust gas, wherein the absorber material can be distributed in the reactor during the operation of the reactor via tipper wagons that run on a circular rail. The tipper wagons of the permanently installed circular rail system are supplied with new absorber material through charging openings in the reactor, which contain a loading space that can be closed in an airtight manner together with a fan for pressurization. These charging openings are technically very complex and are intended to prevent flue gas from being able to escape from the reactor into the surrounding atmosphere.

The object of the present invention is to provide a loading system and a method for loading a reactor using the loading system which are improved with regard to the disadvantages mentioned above.

Said object is achieved by a dismountable and dismantlable loading system as claimed in claim 1. Further claims relate to further advantageous configurations of the loading system and a method for loading a reactor using the loading system.

The present invention relates to a dismountable and dismantlable loading system for loading a reactor with bulk material, comprising:
  (a) a dismantlable rail system with a multiplicity of rail segments which can be connected to one another to form a self-contained rail system, wherein the individual rail segments have attachment means for connecting the rail segments to one another,
  (b) at least one rail vehicle for operation on the rail system, having a holding device for containers for receiving the bulk material, and
  (c) at least one filling station for receiving the bulk material, having a hose present in the floor of the filling station for transporting the bulk material into various areas of the reactor.

The advantage of the loading system according to the invention is that this loading system is dismountable and dismantlable and thus can be transported into the reactor interior space in the dismantled state without all that great an effort even under the cramped conditions in the reactor interior space and only then mounted to form the closed rail system. The rail system with the at least one rail vehicle also makes it particularly easy to transport the bulk material on the rail vehicle quickly and reliably into various areas of the reactor interior space. These areas can also be further away from a manhole through which the bulk material is introduced into the reactor space. The at least one existing filling station for receiving the bulk material, each of which has a hose present in the floor, makes it possible to reliably distribute the bulk material by means of the hose in the reactor interior space even in cramped conditions. The hose continues to slow the bulk material down as it slides through, thus reducing damage to the bulk material.

The rail system may preferably also have brackets for mounting in the reactor. The brackets may, for example, allow the rail system to be reliably applied to optionally present possible attachments in the reactor interior space and to be mounted there without the rail system shifting while the bulk material is being transported. As an alternative, it is also possible that the rail system is merely placed on the pipe systems and remains positionally stable during operation on account of its own weight.

The self-contained rail system may assume a wide variety of shapes, which are defined by the space available in the reactor interior space. The self-contained rail system may be circular, oval or a combination of both shapes, for example, in order to circumvent possible obstacles in the reactor.

Furthermore, the rail segments may have markings for assembling the rail system. In particular, respectively matching markings for the ends of two rail segments that are to be connected to one another may be present at the ends of the individual rail segments. These markings may be color markings and/or number markings, for example. Markings of this type make it possible to reliably locate and correctly mount matching rail segments when the closed rail system is being mounted.

The various rail segments are advantageously plugged into one another and bolted together. This plug-in system allows the rail system to be easily mounted and dismounted under cramped conditions.

According to a further embodiment of a loading system according to the invention, a multiplicity of the filling stations and also a multiplicity of containers may be present, wherein markings for respectively identifying a filling station and at least one container assigned to the filling station are present.

In order to ensure that the reactor interior space is uniformly loaded, the multiplicity of filling stations may be uniformly distributed in the reactor interior space and at least one container may be assigned to each of the filling stations by way of corresponding markings. This makes it possible to uniformly distribute the bulk material reliably in the reactor interior space even in cramped conditions under possibly poor light conditions. The markings may be color markings or number markings, or a combination of color markings and number markings, for example. Furthermore, a plurality of containers may be assigned to one filling station, the markings then also making it possible to reliably assign a plurality of containers to one filling station.

Furthermore, the loading system may comprise a multiplicity of rail vehicles for simultaneous operation on the rail system. This makes it possible to simultaneously transport various containers with the bulk material via the rail system into various areas of the reactor interior space in a particularly simple and time-saving manner. The rail vehicles may be pulled over the rail system manually by personnel in the reactor interior space, for example. As an alternative, automatic, for example electrical, operation of the rail vehicles is also possible. In this case, it would be possible for the drive either to be integrated in the rail vehicles or integrated in the rails themselves, such as e.g in the Beckhoff XTS linear transport system.

According to a further embodiment of a loading system according to the invention, the cross section of the hoses may be compressible. The hoses may for example consist of thermoplastic, flexible polymers, such as for example polyurethane, or comprise these polymers. In particular, use may be made of flat hoses which advantageously do not have any metal or plastic spirals and are therefore particularly flexible. By virtue of the hoses with a compressible cross section, it is also possible to pass the hoses through interspaces in the interior space of the reactor, for example between involute channel systems, and thus to ensure that the reactor is reliably loaded with bulk material via the hoses even under cramped conditions.

Furthermore, the hoses may have a length of at least 1 m, preferably at least 2 m, more preferably in the range of 2 m to 3 m, most preferably in the range of 2.4 to 2.7 m. The optimum hose length depends on the reactor geometry and is approx. ⅓-½ of the total reactor height.

Many reactors, for example conventional reactors for methanol synthesis, have a height of between 7 and 10 m. Hoses with the length mentioned above make it particularly easy to slow down bulk material introduced into the hoses via the filling stations while it is being transported through the hoses and to fill these reactors over most of their height without damaging the bulk material. Bulk material introduced into the filling stations slides through the hoses and is slowed down as a result, such that damage to the reactor or bulk material is avoided if the bulk material falls onto the reactor floor.

The filling stations advantageously have a funnel-shaped configuration, at least in the interior, in order to ensure that the bulk material slides off the filling station into the hose particularly readily. The hose, which then transports the bulk material further into the reactor, may be mounted at the lower end. The external shape of the filling stations may be as desired, e.g. cuboidal or cylindrical.

In a further embodiment of a loading system according to the invention, the hoses are releasably attached to the filling stations. This can be done by means of releasable clamps, for example. When the loading operation is almost finished and a certain fill level has already been reached, the hose is rather an obstruction, and therefore it can then be dismounted particularly easily from the filling station and after that further bulk material can be introduced directly via the filling station without a hose, with newly introduced bulk material being slowed down by bulk material already in the reactor and thus mechanical damage to the bulk material being avoided. This is particularly advantageous when the reactor is to be filled to a height that is just below the height at which the filling stations are located in the reactor.

The hoses may have a diameter in the range of 30 to 80 mm, preferably 40 to 70 mm, more preferably in the range of 45 to 55 mm. Hoses with these diameters can particularly easily be used to also introduce the bulk material into the reactor interior space through interspaces located in the interior space of the reactor, for example between involute channel systems.

According to a further advantageous variant of a loading system according to the invention, the constituent parts of the system, in particular the rail segments, the filling stations, containers and rail vehicles, each have a cross section in the dismantled state that amounts to at most 100 cm, preferably at most 80 cm, more preferably at most 60 cm. The size of the cross section of the dismantled constituent parts may in particular be in the range of 30 cm to 60 cm. The dismantled constituent parts of a system of this type may be introduced into the interior space of the reactor particularly easily through a manhole, which frequently has only a small opening cross section. In this case it is not necessary to dismount parts of the reactor wall again when mounting the rail system in order to gain access to the interior of the reactor.

It is also advantageous if the filling stations each have a device for securing the filling station in the reactor. A device of this type ensures that the filling stations do not move or fall over during the filling process. The securing device may for example be pegs, which are attached to the filling stations and which make it possible to secure them in interspaces between involute channel systems in the reactor interior space, as illustrated schematically in FIG. 2. These pegs also make it particularly easy to take the filling stations out during the filling process when a certain fill level is reached, then to remove the releasable hose and finally to continue the filling process without a hose. The securing devices may for example also be releasable rods that may be inserted between the involute channel system. Clamps that can be used to attach the filling stations are also conceivable. These clamps may be used in particular in order to clamp the filling stations to boxes in the upper area of the involute channel system. As an alternative or in addition, magnets that secure metal filling stations to the involute channel system may also be present.

Another variant of a loading system according to the invention may have containers for receiving the bulk material, in the floor of which are hoses for transporting the bulk material to the filling stations. Hoses of this type can particularly advantageously allow the bulk material to be transported from the containers to the filling stations by means of gravity when the filling stations are positioned underneath the containers.

The present invention also relates to a method for loading a reactor having a lower and an upper reactor area with bulk material using the loading system already described, wherein the method comprises the following method steps:

(A) introducing the dismantled constituent parts of the loading system into the reactor, (B) mounting the rail system in the reactor as a self-contained rail system running around the center of the reactor in the upper area of the reactor, and mounting the filling stations adjacent to the rail system, (C) introducing the bulk material into the reactor and transporting the containers, optionally marked in color and having the bulk material, on the rail system to the filling stations by way of the at least one rail vehicle, (D) transferring the bulk material from the containers to the filling stations optionally marked in color and filling the reactor by conveying the bulk material into the lower reactor area via the hoses, and, (E) if necessary, dismounting and dismantling the loading system and transporting the dismantled constituent parts of the loading system out of the reactor.

Such a method makes it possible to distribute the bulk material with relatively little expenditure of force in different areas of the reactor that are difficult to access. Mounting the loading system in the upper reactor area makes it particularly easy to fill the lower reactor area using gravity, wherein the hoses slow the bulk material down and thus make it possible to introduce the bulk material into the lower reactor area without damage.

After method step (E), the reactor can then be put into operation. The method according to the invention is therefore particularly suitable for introducing catalyst material, for example in the form of pellets, into the reactor interior space in the form of bulk material. Since the catalyst material typically remains in the reactor for a long time during the operation of the reactor, the reactor can then be operated for a long period of time, for example for several years, without it being necessary to replace the bulk material.

According to one refinement of an advantageous method according to the invention, the loading system comprises a multiplicity of containers and a multiplicity of filling stations, wherein markings for respectively identifying a filling station and at least one container assigned to the filling station are present. In method steps (C) and (D), a container is then reliably brought to the filling station to which it is assigned via the rail system, and the bulk material is then poured into this filling station. A marking system of this type makes it possible to reliably identify the respective containers assigned to a certain filling station and to bring them to the respective filling station even under cramped conditions and poor light conditions. This ensures reliable, uniform loading of the bulk material in the reactor interior space.

A plurality of containers may be assigned to one filling station, wherein, in method step (D), this multiplicity of containers is brought to the filling station and, toward the end of the filling operation, the hose is removed from the filling station and the filling operation is subsequently continued without the hose, which is then an obstruction.

In a further variant of a method according to the invention, the reactor has involute channels in the upper area, wherein the bulk material is introduced between these channels into the reactor from the filling stations through the hoses in method step (D). The filling stations may then also be positioned on the involute channels. The flexibly deformable hoses make it particularly easy to introduce the bulk material into the reactor interior space through the interspaces between these channels, even in cramped conditions.

The upper area of the reactor may have a manhole with an opening cross section, wherein the dismantled constituent parts of the loading system are brought into the reactor particularly easily through the manhole in method step (A). In this respect, the constituent parts of the system, in particular the rail segments, in the dismantled state respectively have a cross section which is smaller than the opening cross section of the manhole. The other components of the loading system, such as the containers, rail vehicles and the filling stations, also have a cross section which is smaller than the opening cross section of the manhole. In the case of such a method, it is particularly easy to bring the dismantled constituent parts of the loading system into the reactor interior space without it being necessary to dismantle parts of the reactor shell.

In the case of a method according to the invention, it is also advantageous if a multiplicity of rail vehicles are present and in method steps (C) and (D) the bulk material is continuously distributed in the filling stations by means of this multiplicity of rail vehicles. A method of this type allows a large amount of bulk material to be reliably introduced into the reactor interior space in a particularly simple and time-saving manner within a very short time.

The intention is to explain the invention in more detail below with reference to exemplary embodiments and figures, in which:

FIG. 7 shows a cross section of an arrangement of various filling stations in the interior area of a reactor.

Figure 1:
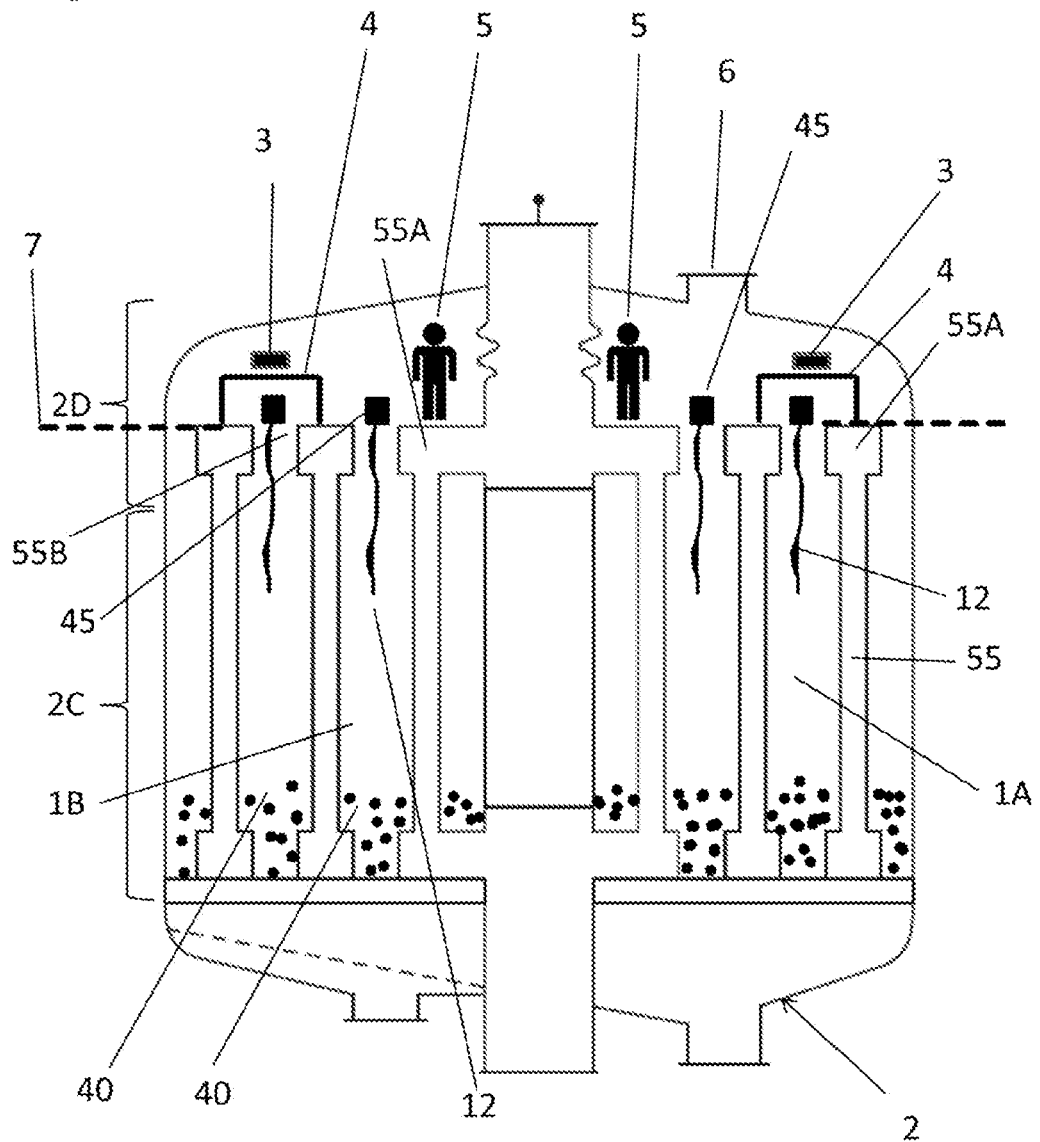
FIG. 1 shows a longitudinal section through a reactor in which a loading system according to the invention is mounted.

FIG. 1 schematically shows a longitudinal section through a reactor (2) in which a loading system according to the invention is mounted. This loading system comprises a rail system (3), which is shown in cross section and which is applied to a framework system (4). Personnel (5) in the reactor interior space stand on the channel systems, i.e. the distribution chambers (55A), which are connected to the cooling pipes (55) in the reactor interior space. In the dismantled state, the loading system can be brought into the interior of the reactor through a manhole (6) in the reactor wall. Filling stations (45) are mounted on the distribution chambers (55A), wherein hoses (12) starting from the filling stations (45) are introduced into the reactor interior through interspaces (55B) between the distribution chambers (55A). At the beginning of the loading operation, these hoses dangle freely in the reactor interior space and slow the bulk material down as it slides through. The loading system is located in the upper area (2D) of the reactor (2). Personnel (5) in the reactor interior space can manually transport the rail vehicles with the containers containing the bulk material, which are not illustrated here for the sake of clarity, via the rail system (3) to the filling stations (45) and then empty the containers into the filling stations respectively assigned to them. The bulk material slides from the upper area of the reactor through the hoses (12) into the lower area (2C) of the reactor.

During operation, the hoses (12) can be removed from the filling stations (45) when a certain fill level of the bulk material (40) has already been reached and subsequently the filling operation is continued through the filling station (45) directly into various interior spaces (1A) and (1B) of the reactor.

The bulk material used may be catalyst material, preferably in the form of pellets, for example catalyst tablets.

Figure 2:
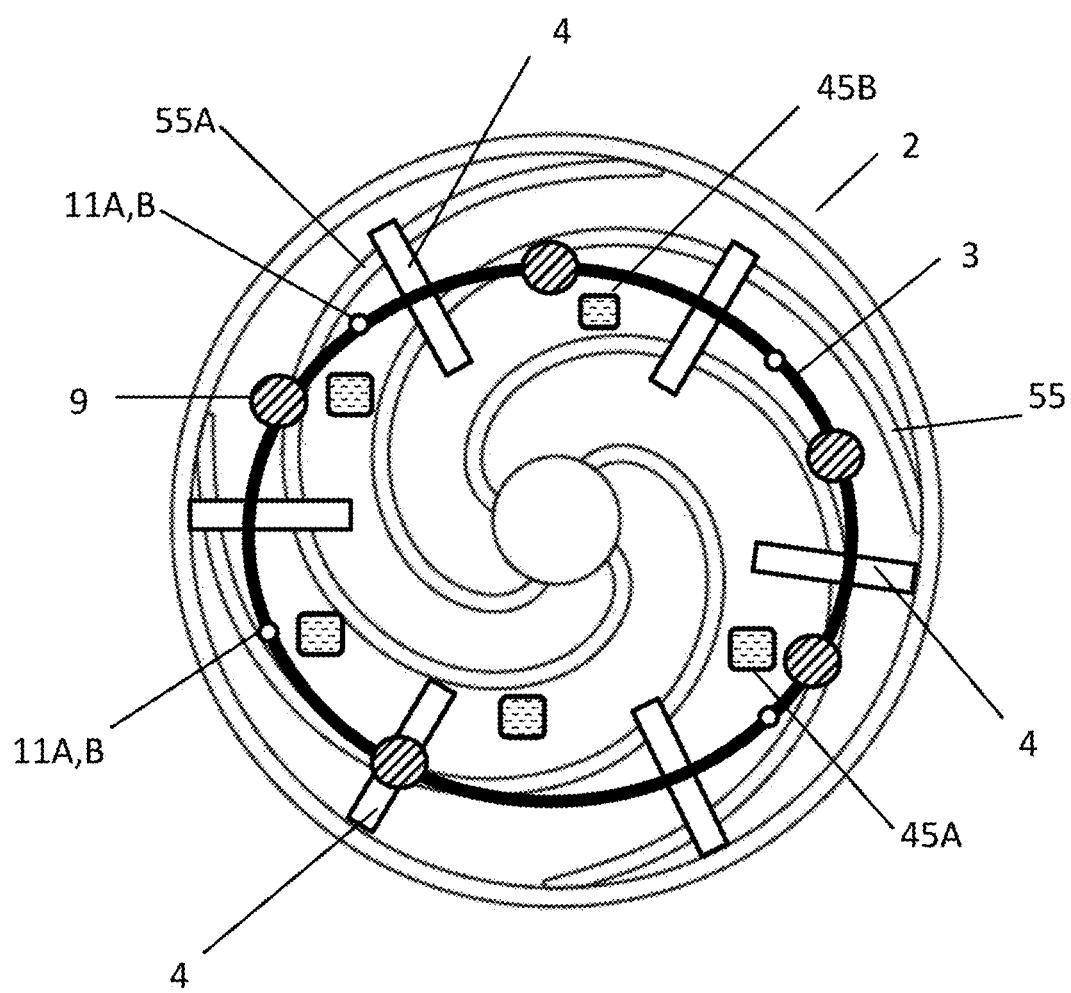
FIG. 2 shows a cross section through the reactor of FIG. 1 along the line denoted by 7.

FIG. 2 shows a cross section through the reactor (2) shown in FIG. 1 along the line denoted by (7). Above this line runs the rail system (3) on which the rail vehicles (9) are movably mounted, in the present case five rail vehicles, whereby a larger number of rail vehicles (9), for example 12 or even more, can be operated. For the sake of clarity, the containers present on the rail vehicles are not shown. Above the line (7) in FIG. 1 there is also the framework system (4) on which the rail system (3) is mounted. The involute channel systems, i.e. the involute distribution chambers (55A), run at the height of the line (7), it being possible for the distance between adjacent distribution chambers to be significantly smaller than that illustrated. Different filling stations (45A, 45B) are mounted close to the rail system (3) between the distribution chambers. FIG. 2 shows that the rail system (3) was assembled from different rail segments on the framework system (4) by means of the attachment means (11A, 11B).

In some filling operations, the framework system (4) or possible attachments already present in the reactor interior space can be dispensed with. In this case, the rail system (3) may be mounted or placed directly on the distribution chambers.

Figure 3:
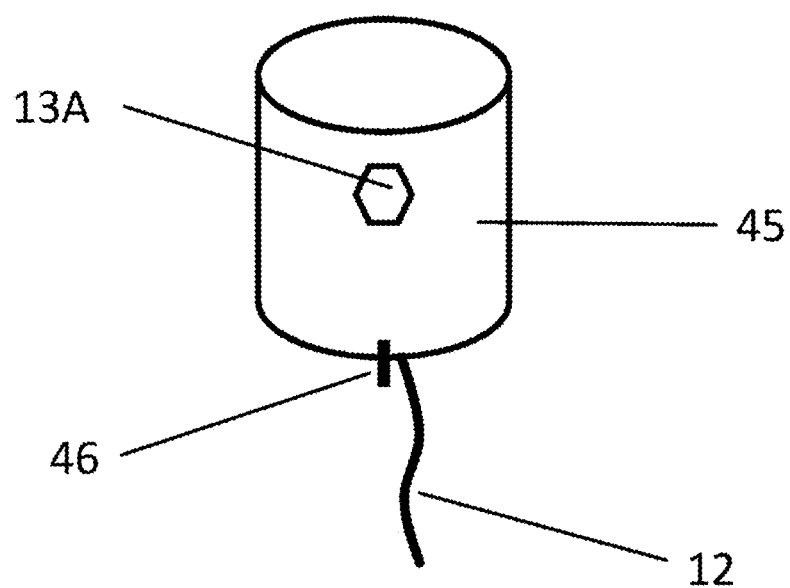
FIG. 3 shows an example of a filling station of a loading system according to the invention outside the reactor.

FIG. 3 shows an example of a filling station (45) which has a securing device in the form of a peg (46). The peg (46) is plugged into the interspaces (55B) between the distribution chambers (55A) in the reactor and serves for positioning the filling station. On the opposite side of the filling station there is another securing device (46) in the form of a second peg (not visible in FIG. 3). The hose (12), which is passed through in the reactor between the distribution chambers and through which the bulk material is introduced into the reactor can be seen below the filling station (45). The filling station also has a marking (13A), which serves for identifying the filling station and allows correspondingly identified containers to be reliably assigned to this filling station during the loading operation.

Figure 4:
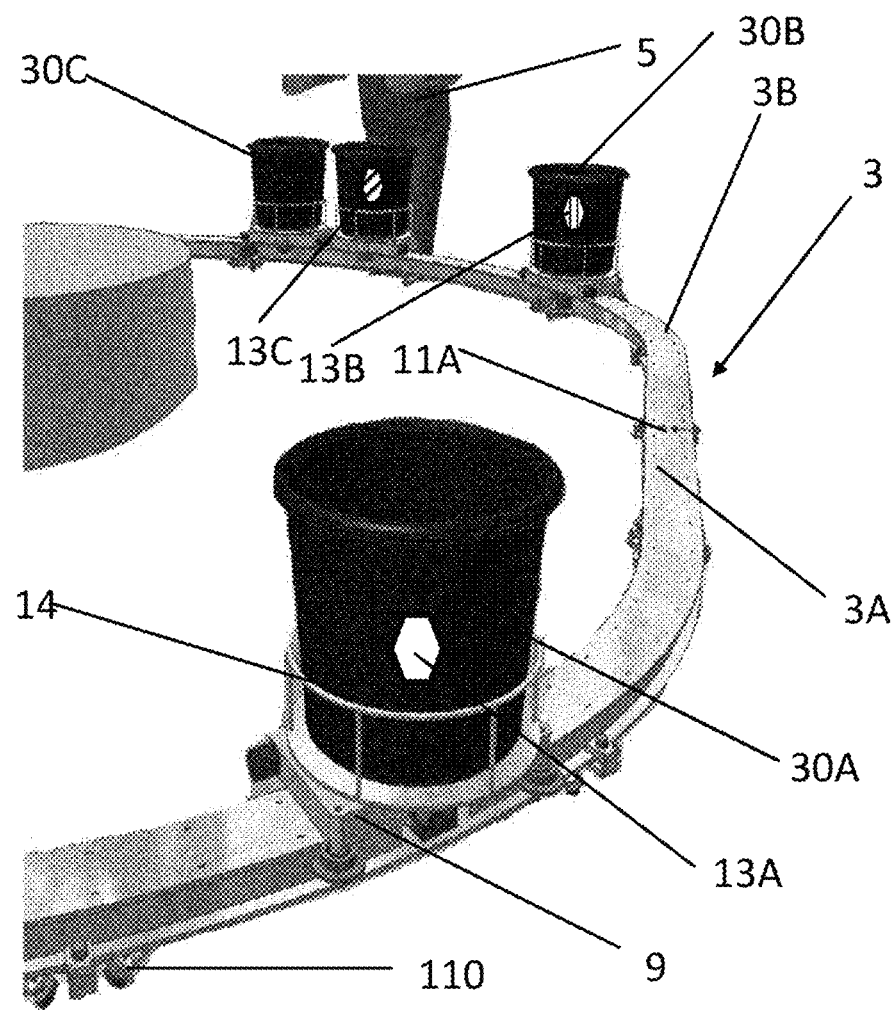
FIG. 4 shows a perspective and schematic detail of a rail system on which rail vehicles and containers for transporting the bulk material are mounted.

FIG. 4 shows a perspective and schematic detail of a rail system (3) according to the invention that is assembled from various rail segments (3A) and (3B) by the attachment means in the form of bolts (11A). Rail vehicles (9) having holding devices (14) in the form of baskets for the containers (30A), (30B) and (30C) for the bulk material are located on the rail system (3). These containers are provided with different markings (13A), (13B) and (13C), which make it possible to assign these containers to different filling stations. Likewise shown schematically is part of a member of personnel (5), who can pull the rail vehicles (9) over the rail system (3) and empty the buckets into the respective filling stations provided for this purpose. FIG. 4 also shows a support (110) for pipes which are part of an attachment system (115) for attaching the rail system (3) to a possible attachment in the interior space of the reactor, such as e.g. a framework system (4).

Figure 5:
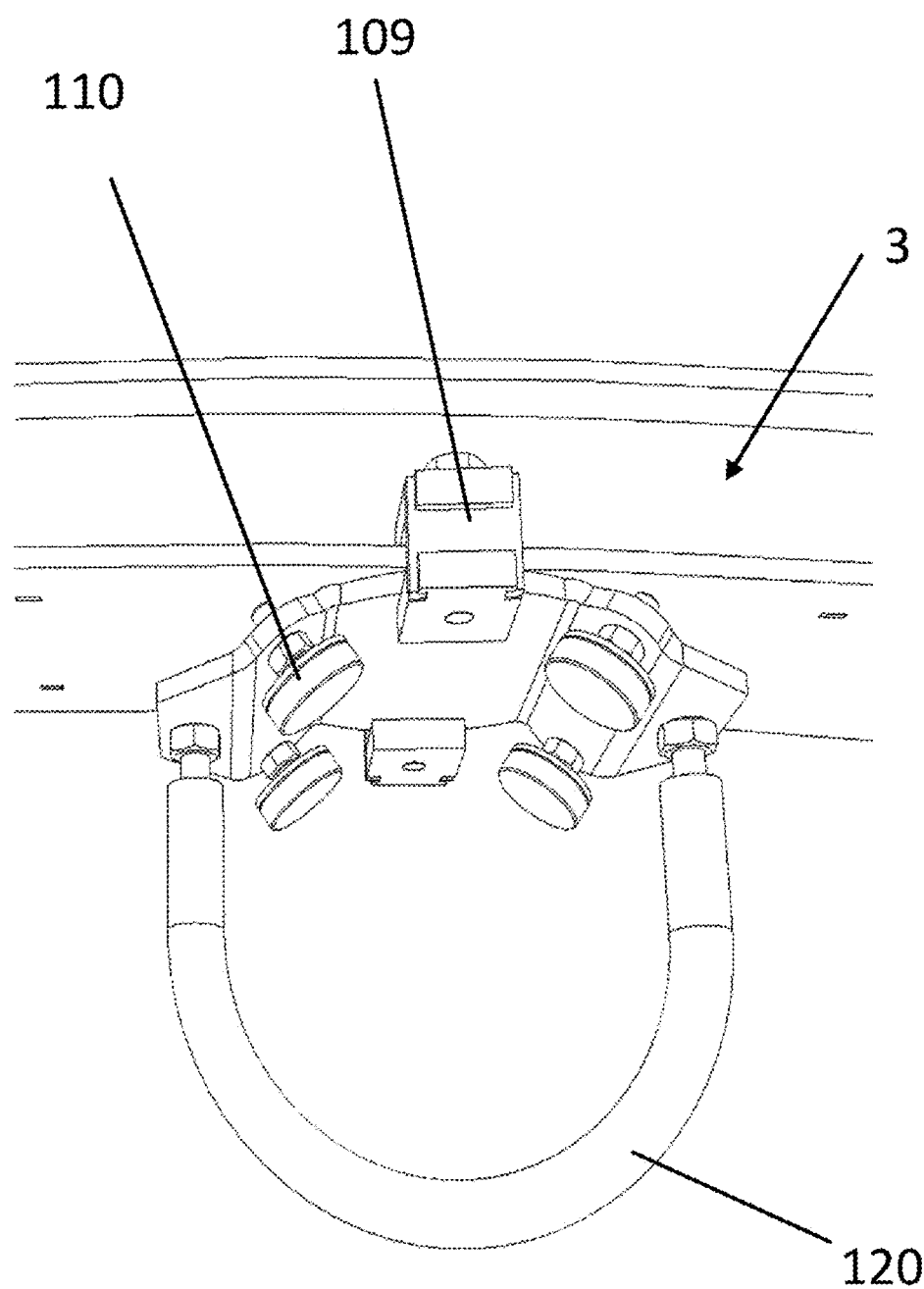
FIG. 5 shows an attachment system with a bracket in order to attach the rail system to e.g. cooling pipes in the reactor.

FIG. 5 shows the attachment system (115), the support (110) of which can be seen in FIG. 4. The support is attached to the rail system (3) by means of a clamp (109). A bracket (120) may be bolted to the support and in the mounted state encloses the pipe system of the reactor in which the rail system is mounted.

Figure 6A:
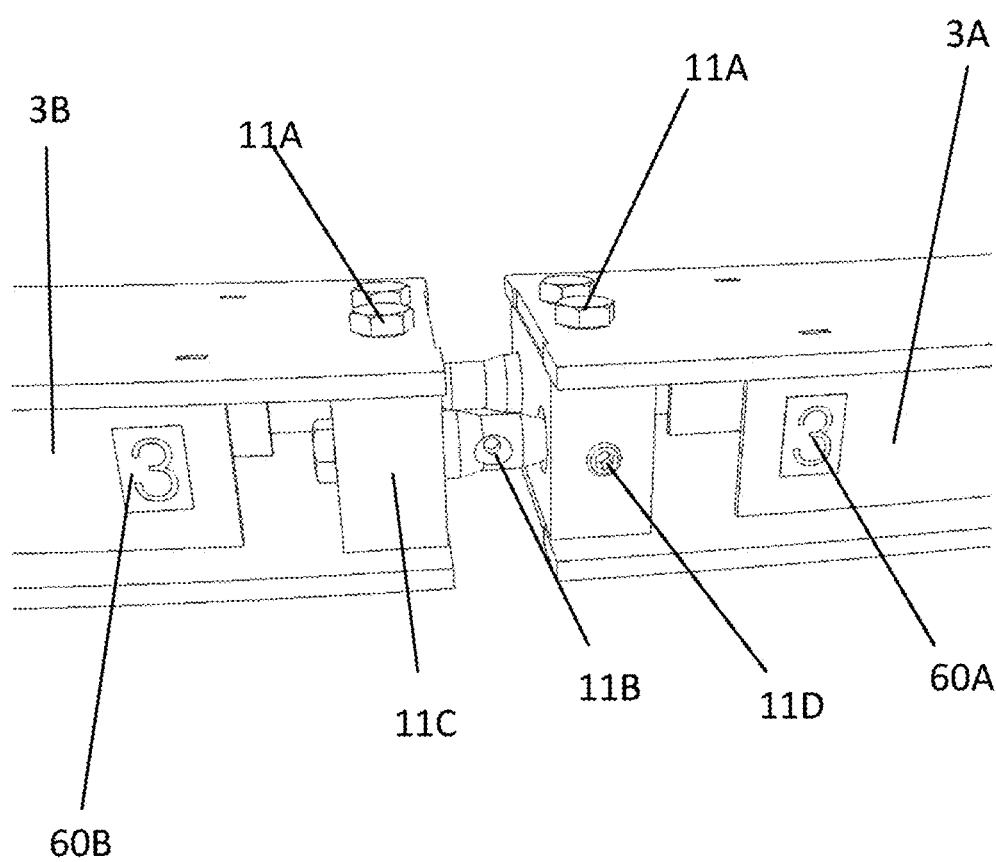
FIGS. 6A and 6B show how two rail segments can be connected to one another via attachment means.

FIG. 6A shows two rail segments (3A) and (3B) of a rail system according to the invention during the assembly. Each rail segment (3A) and (3B) has a block (11C) in each of which a pin (11B) is fixedly mounted. The blocks are connected to the rail segment (3A) or (3B) by bolts (11A). The two pins (11B) are plugged into the blocks (11C) of the other rail segment (3A) or (3B), respectively, and secured by means of two set screws (11D), which are screwed into the blocks of the rail segment (3A) and (3B). This plug-in system allows the rail system to be easily mounted and dismounted.

Both rail segments (3A) and (3B) have markings (60A) and (60B), which in the present case are inscriptions with the numbering 3 and which make it particularly easy to plug the correct rail segments into one another reliably under cramped conditions in the reactor interior and to bolt them together.

Figure 6B:
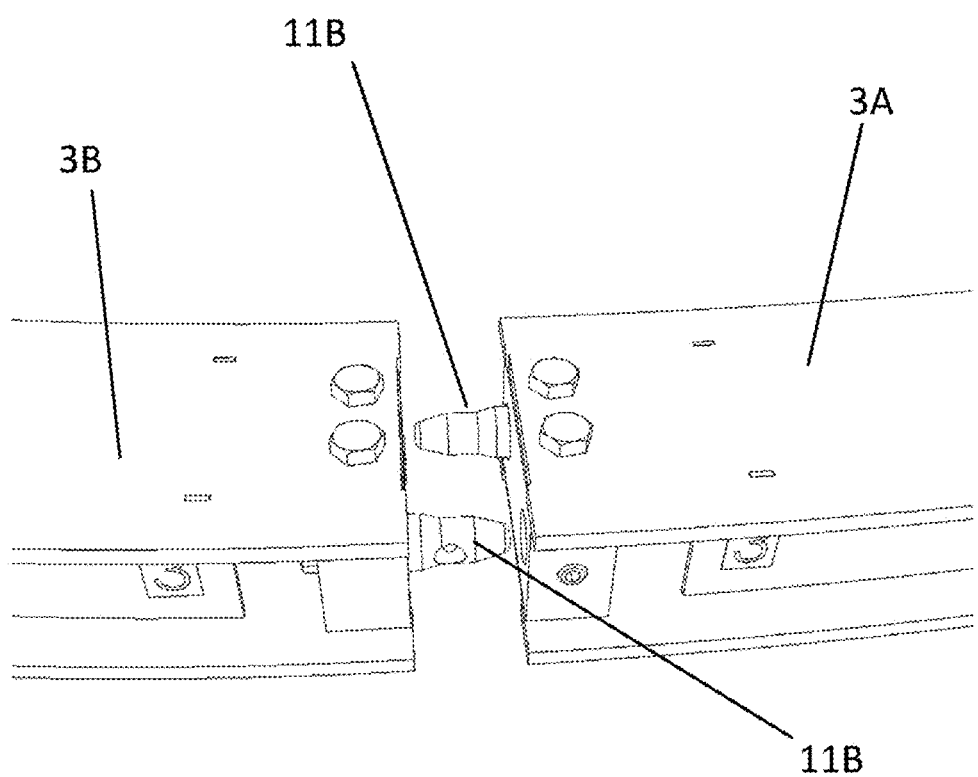

FIG. 6B shows the two rail segments (3A) and (3B) of FIG. 6A from a somewhat different perspective, so that the two pins (11B) can be seen more clearly.

FIG. 7 schematically shows a cross section through a reactor (2), which shows the arrangement of various filling stations (45A), (45B), (45C) and (45D). In the present case, a combination of color coding (not illustrated here) and numbering is used to mark the filling stations and the containers assigned to them. In the present case, the cross section of the reactor is divided into four quadrants, each of which having nine filling stations, which have the same color but different numbering 1 to 9 in each case. The rail system (3) is indicated schematically. On the rail system there are rail vehicles that have the buckets with the corresponding colors and corresponding numbering. The rail vehicles are always moved in the same direction, either clockwise or counterclockwise, and the same amount of catalyst is then loaded in each quadrant. By virtue of the uniform distribution of the filling stations, bulk material is loaded uniformly in each quadrant.

The invention is not restricted by the description with reference to the exemplary embodiments. Rather, the invention encompasses every new feature and every combination of features, this in particular including every combination of features in the patent claims, even if this feature or this combination itself is not explicitly specified in the patent claims or exemplary embodiments.

The invention claimed is:

1. A dismountable and dismantlable loading system for loading a reactor with bulk material, comprising:
   (a) a dismantlable rail system with a multiplicity of rail segments which can be connected to one another to form a self-contained rail system, wherein the individual rail segments are attachable, thereby connecting the rail segments to one another,
   (b) at least one rail vehicle for operation on the rail system having a holding device for containers for receiving the bulk material, and
   (c) at least one filling station for receiving the bulk material, having a hose present in the floor of the filling station for transporting the bulk material into various areas of the reactor.

2. The loading system as claimed in claim 1, wherein the rail segments have markings for assembling the rail system.

3. The loading system as claimed in claim 1, wherein the cross section of the hose is compressible.

4. The loading system as claimed in claim 1, wherein the hose has a length of at least 1 m.

5. The loading system as claimed in claim 1, wherein the hose is releasably attached to the filling stations.

6. The loading system as claimed in claim 1, wherein the hose has a diameter in the range of 30 to 80 mm.

7. The loading system as claimed in claim 1, wherein the the rail segments each have a cross section in the dismantled state that amounts to at most 100 cm.

8. The loading system as claimed in claim 1, wherein the filling stations each have a device for securing them in the reactor.

9. The loading system as claimed in claim 1, wherein the containers for receiving the bulk material have hoses in a floor of the container for transporting the bulk material to the filling stations.

10. The loading system as claimed in claim 1, wherein a multiplicity of rail vehicles for simultaneous operation on the rail system are present.

11. A method for loading a reactor with bulk material, wherein the reactor has a lower and an upper reactor area, using a loading system as claimed in claim 1, having the following method steps:
   (A) introducing the dismantled constituent parts of the loading system into the reactor,
   (B) mounting the rail system in the reactor as a self-contained rail system running around the center of the reactor in the upper area of the reactor, and mounting the at least one filling station adjacent to the rail system,
   (C) introducing the bulk material into the reactor and transporting the containers having the bulk material on the rail system to the at least one filling station by way of the at least one rail vehicle, (D) transferring the bulk material from the containers to the at least one filling station and filling the reactor by conveying the bulk material into the lower reactor area via hoses, and, (E) if necessary, dismounting and dismantling the loading system and transporting the dismantled constituent parts out of the reactor.

12. The method as claimed in claim 11, wherein the loading system comprises a multiplicity of containers and a multiplicity of filling stations, and markings for respectively identifying a filling station and at least one container assigned to the filling station are present on the multiplicity of containers and the multiplicity of filling stations, and wherein, in method steps (C) and (D), a container assigned to a certain filling station is transported to this filling station via the rail system, and the bulk material is poured into this filling station.

13. The method as claimed in claim 12, wherein, in method step (D), a plurality of containers are assigned to a filling station and wherein, toward the end of the filling operation, the hose is removed from the filling station.

14. The method as claimed in claim 12, wherein the reactor has involute channels in its upper area, and the bulk material is introduced between the channels into the reactor from the filling stations through the hoses in method step (D).

15. The method as claimed in claim 12, wherein the upper area of the reactor has a manhole with an opening cross section, and the dismantled constituent parts of the loading system are brought into the reactor through the manhole in method step (A), wherein the constituent parts of the system, in particular the rail segments, each have a cross section in the dismantled state which is smaller than the opening cross section of the manhole.

16. The method as claimed in claim 12, wherein a multiplicity of rail vehicles are present and in method steps (C) and (D) the bulk material is continuously introduced into the reactor by means of a multiplicity of containers and distributed in the filling stations via the rail vehicles.

17. The method as claimed in claim 12, wherein the bulk material used is catalyst material.

18. The method as claimed in claim 17, wherein the catalyst material is in the form of pellets.

19. The loading system as claimed in claim 1, wherein the hose has a length of at least 2 m.

20. The loading system as claimed in claim 1, wherein the rail segments each have a cross section in the dismantled state that amounts to at most 80 cm.

* * * * *